United States Patent
Klenner

(10) Patent No.: US 6,233,437 B1
(45) Date of Patent: May 15, 2001

(54) METHOD AND APPARATUS FOR TESTING MOBILE COMMUNICATION DEVICE EMPLOYING FREQUENCY HOPPING

(75) Inventor: Günther Klenner, Rosenhelm (DE)

(73) Assignee: Wavetek GmbH, Ismaring (DE)

( * ) Notice: Subject to any disclaimer, the term of this patent is extended or adjusted under 35 U.S.C. 154(b) by 0 days.

(21) Appl. No.: 09/335,610

(22) Filed: Jun. 18, 1999

(30) Foreign Application Priority Data

Jun. 19, 1998 (DE) .............................................. 198 27 486
Aug. 10, 1998 (DE) .............................................. 198 36 162

(51) Int. Cl.$^7$ .............................. H04B 17/00; H03C 1/62
(52) U.S. Cl. .......................... 455/115; 455/67.1; 455/62; 455/67.4; 455/425; 375/132
(58) Field of Search ................................. 455/67.1, 67.4, 455/67.3, 115, 226.1, 226.2, 226.3, 425, 423, 62; 375/132, 133, 135, 136, 138, 225, 227

(56) References Cited

U.S. PATENT DOCUMENTS

| | | | |
|---|---|---|---|
| 4,415,770 | * 11/1983 | Kai et al. ........................... | 179/2 EB |
| 4,554,410 | * 11/1985 | Furumoto ............................. | 179/2 E |
| 5,425,076 | * 6/1995 | Knippelmeir ......................... | 379/27 |
| 5,521,904 | * 5/1996 | Eriksson et al. ....................... | 370/15 |
| 5,619,550 | * 4/1997 | Averbuch et al. ...................... | 379/5 |
| 5,731,699 | * 3/1998 | O'Byrne ............................. | 324/77.11 |
| 5,943,617 | * 8/1999 | Nakamura ........................... | 455/423 |
| 6,018,543 | * 1/2000 | Blois et al. .......................... | 375/202 |

FOREIGN PATENT DOCUMENTS

| | | |
|---|---|---|
| 4205239A1 | 8/1993 | (DE) . |
| 4330705A1 | 3/1995 | (DE) . |
| 19528563C2 | 6/1997 | (DE) . |
| 19621925A1 | 12/1997 | (DE) . |
| 19651334A1 | 6/1998 | (DE) . |

| | | |
|---|---|---|
| 0 712 258 | 5/1996 | (EP) . |

OTHER PUBLICATIONS

Seigmund Redl, Logic, Matthias Weber, Sony PCE, Malcolm Oliphant, IFR Systems.

Ref: "GSM–Technik und Messpraxis" by S. Redl and M. Weber, 2$^{nd}$ edition, Poing, Franzis Publish, 1995, (Funkschau–Technik).

(List continued on next page.)

*Primary Examiner*—Edward F. Urban
*Assistant Examiner*—Marleau Milford

(57) ABSTRACT

A method and apparatus for testing mobile communication devices involve utilizing the device's frequency hopping capabilities to substantially reduce the time required to measure operational parameters of the device at a plurality of frequencies across the device's operational frequency band. Prior to conducting the multi-frequency test, a device tester defines a hopping list of test frequency channels and transmits the hopping list and command signals to the mobile communication device for testing a set of operational parameters of the device at all of the test frequencies. The mobile communication device then measures all of the parameters at all of the frequencies by repeatedly sequentially hopping through the test frequencies in accordance with the hopping list. Since the period between frequency hops is shorter than the time required to complete measurement of a parameter at a particular frequency, each parameter measurement at each test frequency is obtained by combining measurement results of plural bursts at each test frequency. The process eliminates the time-consuming need to transmit control signals between the tester and device prior to conducting parameter tests at each frequency. By rapidly hopping among test frequencies across the frequency band, the effect of making operational adjustments to the mobile communication device while under test can be observed in real time across the frequency band, thereby simplifying the adjustment process.

27 Claims, 2 Drawing Sheets

OTHER PUBLICATIONS

Maucksch, T., "Messugen an Basis—und Mobilstationen mit GSM–Messplatz CMTA 94," Neuse Von Rohde & Schwarz, DE, Bd 31, Nr. 132, 1991, pp. 23–25.

Kam, C., "Mobilfunk HF–Messungen an GSM–Sendern, Teil 2," Funkschau, DE, Franzis–Verlag K.G. Munchen, Bd. 62, Nr. 24, Nov. 16, 1990, pp. 71–76.

Kam, C., "Mobilfunk HF–Messungen an GSM–Sendern," Funkshcau, DE, Franzis–Verlag K.G. Munchen, Bd. 62, Nr. 23, Nov, 2, 1990, pp. 54, 55, 58, 59.

Rosar, W., "Teststrategien, Messgerate und—Systeme IM GSM—Teil 1," NTZ Nachrichtentechnische Zeitschrift, DE, VDE Verlag GMBH, Berlin, Bd. 47, Nr. 9, Sep. 1994, pp. 654–658.

"A GSM Digital Radio Communications Test Set," Microwave Journal, US, Horizon House, Dedham, Bd. 40, Nr. 5, May 1997, pp. 348, 350, 352.

Maucksch, T., "GSM–Messplatz CMTA 94 fur das digitale europaische Mobilfunketz," Neues Von Rohde & Schwarz, Bd. 30, Nr. 129, 1990, pp. 4–7.

* cited by examiner

METHOD AND APPARATUS FOR TESTING MOBILE COMMUNICATION DEVICE EMPLOYING FREQUENCY HOPPING

BACKGROUND OF THE INVENTION

Mobile phones are tested during manufacturing and in service depots to ensure ultimate quality control for fulfilling the necessary specifications for operating in the cellular network. As for manufacturing, such test measurements serve to determine when it is necessary to exchange defective components, to minimize manufacturing errors and to maintain quality control. Further, regarding end control, the test measurements serve for checking the basic functions and for the final trimming or alignment of the mobiles. Also, test measurements can assist in the search for defects in defective mobiles in a repair shop or checking basic functions in a dealer's shop. In order to conduct such quality measurements test equipment for carrying out RF tests is required, in particular so-called mobile testers.

In the prior art, for determining the transmission quality respective measurement values, characteristic of the relevant specifications, are taken in single frequency channels of a cellular telecommunication net or network. Measurements values comprise RF parameters such as power, frequency, phase/frequency error, burst behavior, time behavior and bit error rate for single communication channels of a network. The sampling of the relevant physical measurement values or parameters for characterizing the channel properties are considered to be important means or tools for determination of the RF parameters and, thus, for securing quality when manufacturing or servicing mobiles. The selection of several frequency channels serves for testing or checking whether the mobile or terminal or telecommunicator fulfills its specifications over the entire frequency range.

To this end, the frequency channels of the used frequency band (e.g., frequency channels $f_1$, $f_2$ and $f_3$ shown in FIG. 1) are sequentially switched through, wherein a complete measurement of the respective frequency channel relating to measurement values such as power, frequency, phase, burst behavior, time behavior and bit error rate is taken before the measurement is switched to the next channel (see FIG. 2). That is, in the prior art these quality measurements are carried out sequentially for the single frequency channels. In each single frequency channel the entire or complete desired set of measurement values or RF parameters is sampled before it is switched over to the next frequency channel to start the measurement procedure anew.

The switching between the single frequency channels requires, at each and every time, the exchange of data packets or telegrams comprising command signals between the mobile tester and the mobile under test in order to adjust the mobile to the respective new frequency channel, also in particular with respect to exact point in time when the switching is intended to take place. In other words, in order to switch the mobile under test to the respective next frequency channel and to adjust it thereto, in particular regarding the timing and synchronization, there have to be intermittently exchanged protocol sequences comprising command signals between the mobile under test and the testing device (see FIG. 3). In summation, unwanted long measurement times are necessitated since command signals have to be exchanged between the mobile tester and the mobile and the necessary synchronization of the tester with the mobile for switching between the frequency channels with interweaved measurement cycles. On the one hand these long testing times are caused by the time a measurement takes and on the other hand by the command intervals. Thus, this process is very time consuming and needs much specialized software.

Regarding repair and service of mobiles, it is known to carry out adjustments or trimmings of components in these mobiles in order to optimize transmission quality. It is quite time consuming to determine the effect of such adjustments and trimmings for all parts of one or more frequency bands, in particular also within one band. Therefore, such a trimming is quite time consuming, costly and difficult to optimize.

Telecommunication systems or networks are known in the prior art which comprise a so-called frequency hopping technique. As an example, so-called GSM, i.e. Global System of Mobile communications, systems are known. With these systems during transmission operation of a mobile a digitized speech signal is transmitted using a frequency hopping technique using several frequency channels of a frequency band, wherein in a fraction of a second a switching occurs from one frequency channel to a next one. By using more than one frequency channel in a successive manner the transmission of information is less dependent on the transmission quality of a single frequency channel. Thereby, the frequency hopping ability of the GSM network serves for reducing the danger of interferences by using several frequency channels which are switched over from burst to burst in a particular order. The prior art is unsatisfactory in that the known measurement methods are time consuming and thereby costly.

OBJECT OF THE INVENTION

The object underlying the present invention is to overcome the drawbacks of the prior art mentioned-above, and in particular to provide a method and an apparatus for testing telecommunicators, in particular mobiles phones, which requires considerable less time and still achieves a high quality measurement.

SUMMARY OF THE INVENTION

According to a first aspect, the present invention relates to a method of operation for a telecommunicator testing device intended for measurements of telecommunicators. In particular, cellular phones or mobile phones, which are used in connection with at least one net comprising frequencies or frequency channels, wherein characteristic measurement values for at least two frequencies or frequency channels are determined for the telecommunicator under test. The measurement values are assigned to the frequency channels. According to a second aspect, the present invention relates to a method for adjusting and/or trimming of a telecommunicator, in particular a RF terminal, such as a cellular phone or a mobile phone, operating in connection with at least one net comprising frequencies or frequency channels, using a telecommunicator testing device. Characteristic measurement values in at least two frequencies or frequency channels are determined for the telecommunicator device under test, and wherein the telecommunicator is adapted for a frequency hopping method.

According to the present invention the entire information concerning the control of the measurement is defined at the beginning of the measurement and is transmitted from the testing device to the mobile. According to the second aspect of the present invention, an on-line display of the measurement values is achieved by controlling the measurement according to a pre-defined test frequency list in accordance with the frequency hopping technique. Inasmuch as based on the frequency hopping technique a plurality of frequencies is sampled or reached within a second the effects of a trimming or of an adjustment concerning hardware and/or software of a mobile can be displayed on a screen or a monitor in real time or simultaneously for a large frequency range, in particular also for several frequency bands. Thus, a faster and better testing can be carried out.

It is characteristic for the present invention that before the actual measurement starts a protocol phase is initiated comprising an agreement list of the respective frequency channels, wherein the frequency hopping ability inherent to the network is used. This is in contrast to the prior art which relies on measurements in the respective frequency channels and comprises intermittent protocol sequences for switching over and adjusting the mobile. By eliminating these intermittent protocol sequences, each having a duration of a second or longer, the time needed for testing can effectively be reduced to the process of measurement and subsequently enormous time can be saved. At the beginning of the measurements the sequence of the frequency channels that should be sampled can be defined. According to the invention the measurement of a characteristic measurement value or parameter is conducted between two, in particular subsequent, frequency hops. Preferably, a measurement or a test is conducted or carried out before the measuring method according to the present invention in order to check whether the mobile does indeed work in the frequency hopping mode.

Preferably, the entire information concerning the control of the measurement is stored in the mobile during the measurement. To this purpose, a RAM memory for storing the hop set is particularly adapted.

According to a particularly time saving variation of the present invention the frequency channels are cyclically sampled. In the alternative, the frequency channels can also be sampled pseudo-randomly. Thereby, the pre-defined frequency channels are continuously reiterated according to their sequence or order so that the sampled measurement values can be displayed in real time. For instance, the influence of a hardware change or trimming of the mobile under test can immediately be examined for more than one frequency.

According to an embodiment, the frequencies are continuously sampled during the measurements in a single measurement sequence.

According to another embodiment of the present invention, which is particularly adapted to standardized measurement processes, the necessary time for sampling the measurement values is pre-defined at the beginning of the measurements.

Advantageously, the command regarding the power level for transmission is transmitted from the tester to the mobile only once and at the beginning of the testing. This power level is then used in the frequency hopping mode. This is particularly useful in order to save testing time inasmuch as in the prior art at each change in frequency the desired power level has to transmitted from the testing apparatus to the mobile under test.

The above-stated object is achieved by a mobile testing apparatus comprising at least one signal generator for generating test signals and measurement value sensors for sampling characteristic measurement values for the telecommunicator under test wherein for each frequency channel a memory field of the telecommunicator testing device is provided for storing the sampled measurement values. A memory assigned to the mobile under test is at least partially provided for storing data assigned to the defined frequency channels. Thereby, on the one hand the information concerning the list of the frequency channels to be sampled for the mobile under test is available, while on the other hand the sampled data for the frequency channels collectively worked on can be stored in a memory field in a matrix-like manner.

Advantageously, the characteristic measurement values comprise the sensitivity parameter BER. According to the invention this measurement parameter can be measured in the hopping mode for a plurality of frequencies and is assigned to the single frequencies.

DETAILED DESCRIPTION OF PREFERRED EMBODIMENTS

In the following embodiments of the present invention will be discussed in more detail.

Figure 1:
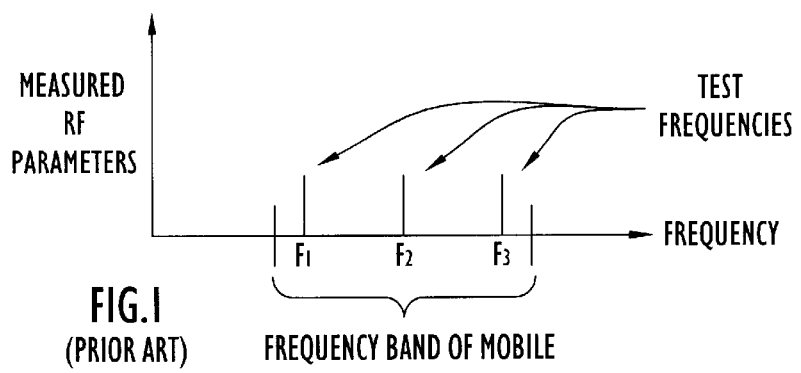
FIG. 1 is a graphical representation of test frequencies within a frequency band of a mobile communication device at which RF parameters of the device are sequentially measured.
Figure 2:
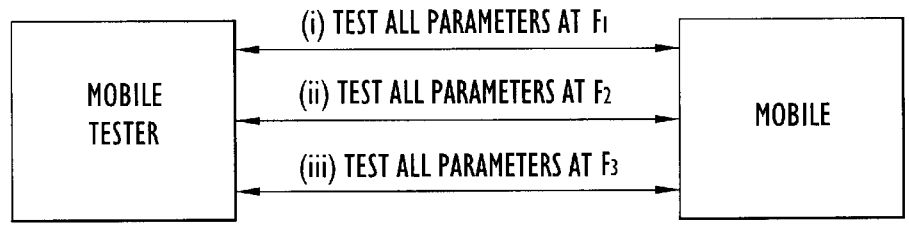
FIG. 2 is a functional block diagram illustrating a conventional sequence of exchanges at successive frequencies between a mobile tester and a mobile communication device.
Figure 3:
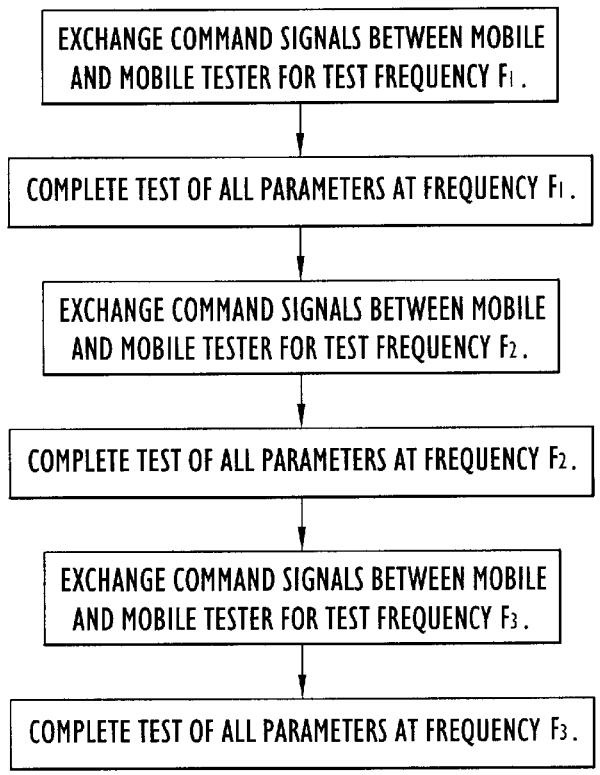
FIG. 3 is a flow diagram illustrating the sequence of events performed in a conventional testing process to test operation of a mobile communication device at plural frequencies.
Figure 4:
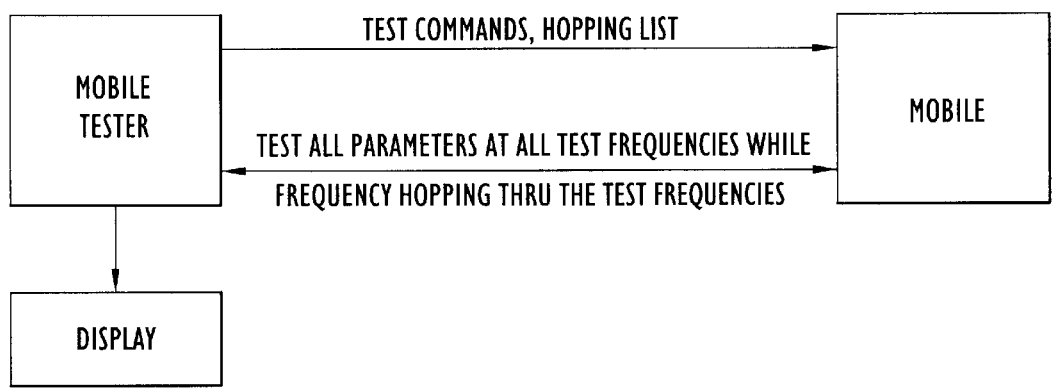
FIG. 4 is a functional block diagram illustrating the interaction between a mobile tester and mobile communication device in testing operational parameters of the device at plural frequencies in accordance with the present invention.
Figure 5:
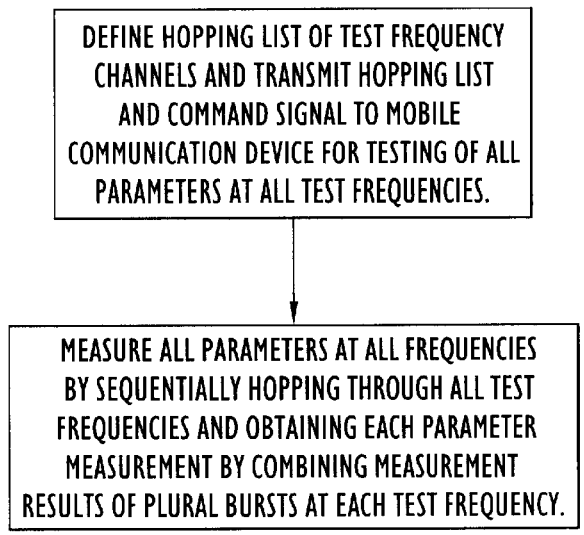
FIG. 5 is a flow diagram illustrating the process of testing operation of a mobile communication device at plural frequencies in accordance with the present invention.

Referring to FIGS. 4 and 5, the starting point of the method according to the invention is that before the start of the proper measurements a list of frequency channels is defined which are then cyclically repeated wherein in each of these frequency channels measurement values are determined and individually assigned to the respective channel. The measurements are carried out in such a way that during a first "burst", which is the time slot provided for transmission based on the underlying time division multiplex concept, a measurement is carried out in a first defined frequency channel whereafter the mobile switches or comes into the next defined frequency channel for the measurement set being provided therefor wherein the measurement data determined thereby are assigned to a memory field of the testing device in a cyclically continuing manner and wherein the measurement results are displayable in real time.

The mobile tester transmits to the mobile a so-called hopping list, which is stored in the mobile. This is insofar similar to the conventional operation of the mobile in the net, but novel with respect to testing purposes. Therefore, the selection of the frequencies is less dependent on transmission quality, as is the case with frequency hopping used in transmission of speech signals, but rather on the frequencies where test results should be obtained. For instance, three frequencies, i. e. a lower frequency, a middle frequency and an upper frequency in the respective band are selected.

If, for instance, the measurement is started with measuring power then this parameter will be measured until the necessary test results have been completed for all three frequencies. Inasmuch as in the hopping mode the mobile (and the tester) switches frequencies in fractions of a second (i. e., in a so-called burst), the time to carry out the power measurement in one burst is insufficient. Thus, the power measurement is only started in the first burst and is continued when this frequency is again reached in the hopping cycle. The results of the measurement are written in respective storage fields of a memory of the mobile tester and can be combined after obtaining the entire measurement so that complete test results are available.

By eliminating the time intervals corresponding to the command signals, signalizing the change of frequency and known from the prior art, the measurement data are continuously sampled and subsequently assigned to the single frequency channels and stored, resulting in a substantial increase in the measurement speed as compared to the prior art. The command signals necessary for the method according to the invention are exchanged during a single preceding command signal interval before the start of the measurement data sampling, wherein a list of the frequency channels to be sampled and if necessary their order is predefined.

In connection with the conventional GSM system, and in particular the German D-net, which is a cellular system around about 900 Megahertz, there is a reduction of the test times due to the absence of the intermittent command intervals of typically up to three seconds. This leads to a substantial reduction of the test time and, thus advantageously to a reduction of costs.

The telecommunicator measurement apparatus for carrying out the method according to the invention comprises a signal generator for producing high-frequency test signals for the mobile under test and sensors for sensing characteristic measurement values. Appropriate interfaces and high resolution analog/digital converters and digital/analog converters electrically connect these components with a central computer control. The measured data are received in a memory wherein all data assigned to a certain frequency channel are each in a respective storage field.

The measurement method according to the invention is based on the "hopping" ability of mobiles, such as is particularly useful in connection with the GSM standard. The complete measurement of single frequency channels is carried out in the "hopping" mode. Inasmuch as the command signals are too dissimilar from the usual starting signalization, the start of the function tests is not substantially postponed. The advantage lies in the absence of switching command times (signalization, timing and synchronization of the frequency change). As the mobile under test switches through the measurement frequencies, the measurement data can be continuously sampled and assigned to the respective frequency channel afterwards.

Advantageously, real time display of the effects caused by changes with respect to hardware and/or software of the mobile under test, such as the influence of instantaneously trimming (adjusting a trimmer or the working point of a transistor, bending a wire coil and similar adjustments serving for optimization of a mobile's operation) can be nearly simultaneously be displayed in real time or on-line on several frequency channels. In particular, the sensitivity can be determined in several frequency channels in real time.

Without further analysis, the foregoing will so fully disclose the gist of the present invention that others can readily adapt it for various applications with omitting features that, from the standpoint of prior art, fairly constitute essential characteristics of the generic or specific aspects of this invention and, therefore, such adaptions should and are intended to be comprehended within the meaning and range of equivalence of the following claims. In particular, the invention comprises the use of the hopping ability of a telecommunication device, in particular a mobile, to accelerate the function test assigned to single frequency channels.

What is claimed is:

1. Method for adjusting and/or trimming of a communication device intended for operation in at least one network comprising frequencies or frequency channels, using a communication testing device, the method comprising the steps of:
    (a) adjusting or trimming the communication device;
    (b) performing a testing operation by measuring an operational parameter of said communication device under test in at least two frequencies or frequency channels, said communication device being adapted for a frequency hopping technique, wherein the testing operation is controlled according to a pre-defined test frequency list according to the frequency hopping technique; and
    (c) displaying measurements of the operational parameter for said at least two frequencies or frequency channels nearly simultaneously such that effects caused by said adjusting or trimming in said at least two frequencies or frequency channels are observable in real time.

2. Method according to claim 1, wherein said displaying of the operational parameter measurements assigned to different frequencies is simultaneously achieved on a screen.

3. Communication testing device for measurement of a communication device for operation with at least one network comprising frequencies or frequency channels, comprising:
    means for performing a testing operation by measuring an operational parameter of said communication device under test in at least two frequencies or frequency channels, said communication device being adapted for a frequency hopping technique, said testing operation being controlled according to a pre-defined test frequency list according to the frequency hopping technique; and
    means for displaying measurements of the operational parameter for said at least two frequencies or frequency channels nearly simultaneously such that effects caused by adjusting or trimming the communication device in said at least two frequencies or frequency channels are observable in real time.

4. Method of testing a mobile communication device, comprising the steps of:
    (a) using a frequency hopping mode of the mobile communication device to select a sequence of at least two frequencies or frequency channels;
    (b) for each frequency or frequency channel in the sequence, sampling data in order to sense at least one operational parameter in the frequency or frequency channel; and
    (c) determining a value of the operational parameter in each frequency or frequency channel in the sequence.

5. Method according to claim 4, wherein said mobile communication device is a mobile or cellular phone.

6. Method according to claim 5, wherein, for each selected frequency channel, said operational parameter is assigned to said selected frequency channel, thereby indicating performance of the mobile communication device on a per frequency-channel basis.

7. A method of testing operation of a communication device within a frequency band, comprising the steps of:
(a) defining a hopping list of plural frequencies; and
(b) measuring an operational parameter of the communication device at each of the plural frequencies by frequency hopping through the plural frequencies in accordance with the hopping list, wherein a period of time between frequency hops is less than the time required to measure the operational parameter at a single frequency, such that each frequency hop burst results in a partial measurement of the operational parameter at a single frequency, and an entire measurement of the operational parameter is formed at each frequency by combining partial measurements of the operational parameter from plural bursts at said frequency.

8. The method of claim 7, wherein said communication device is a mobile communication device.

9. The method of claim 7, wherein step (b) includes measuring said operational parameter at the plural frequencies without reception of intervening measurement protocol messages.

10. The method of claim 9, further comprising the steps of:
(c) transmitting all information relating to timing of parameter measurements from a communication testing device to said mobile communication device prior to performing any parameter measurements; and
(d) storing said all information in said mobile communication device during the parameter measurements.

11. The method of claim 10, wherein said all information comprises the kind, the number, the order and the test times of said frequencies, and wherein said all information also comprises the power level for transmission.

12. The method of claim 7, wherein step (b) includes cyclically hopping through the frequencies in hopping list.

13. The method of claim 7, a time required to measure the operational parameter is at each frequency is pre-defined.

14. The method of claim 7, wherein said operational parameter is the bit error rate (BER).

15. Method of testing a mobile communication device to determine performance of the mobile communication device at each of a plurality of frequencies or frequency channels, the method comprising the steps of:
(a) supplying control information from a communication testing device to the mobile communication device, the control information specifying a testing operation involving each of the plurality of frequencies or frequency channels; and
(b) performing the testing operation by measuring an operational parameter of the mobile communication device at each of the plurality of frequencies or frequency channels in accordance with the control information, such that a value of the operational parameter is determined at each of the plurality of frequencies or frequency channels, thereby determining performance of the mobile communication device at each of the plurality of frequencies or frequency channels.

16. Method according to claim 15, wherein said mobile communication device is a mobile or cellular phone.

17. Method according to claim 16, wherein step (b) includes sampling said operational parameter in the respective frequency channels without intervening protocol exchanges between said communication testing device and said mobile communication device.

18. Method according to claim 17, wherein step (a) further includes transmitting all information relating to the timing of the testing operation from said communication testing device to said mobile communication device prior to the start of the testing operation, the method further comprising the step of:
(c) storing said all information in said mobile communication device during the testing operation.

19. Method according to claim 18, wherein said all information comprises the kind, the number, the order and the test times of said frequencies or frequency channels to be sampled, and wherein said all information also comprises the power level for transmission.

20. Method according to claim 19, wherein said mobile communication device is adapted for frequency hopping, wherein step (b) includes controlling the testing operation according to a predefined test frequency list of frequency channels in accordance with a frequency hopping technique.

21. Method according to claim 20, wherein frequency channels in said pre-defined test frequency list are cyclically sampled.

22. Method according to claim 20, wherein frequency channels in said pre-defined test frequency list are continuously sampled during the testing operation in a single measurement set.

23. Method according to claim 20, wherein step (c) includes pre-defining the measurement time necessary for sampling of the measurement values prior to the start of the testing operation.

24. Method according to claim 20, wherein said characteristic measurement values comprise the sensitivity parameter bit error rate (BER).

25. The method of claim 15, wherein said at least one network is a wireless network.

26. Communication testing device for testing a mobile communication device to determine performance of the mobile communication device at each of a plurality of frequencies or frequency channels, comprising:
means for supplying control information to the mobile communication device, the control information specifying a testing operation involving each of the plurality of frequencies or frequency channels; and
means for performing the testing operation by measuring an operational parameter of the mobile communication device at each of the plurality of frequencies or frequency channels in accordance with the control information, such that a value of the operational parameter is determined at each of the plurality of frequencies or frequency channels, thereby determining performance of the mobile communication device at each of the plurality of frequencies or frequency channels.

27. Communication testing device according to claim 26, further comprising:
a signal generator for the generation of test signals;
parameter sensors for sampling the operational parameter of the mobile communication device under test; and
a plurality of memory fields respectively assigned to a plurality of measured frequency channels for storing the sampled operational parameter of the respective measured frequency channels.

* * * * *